(12) United States Patent
Takizawa (10) Patent No.: US 6,328,138 B1
(45) Date of Patent: Dec. 11, 2001

(54) BRAKE OPERATING DEVICE WITH MODULATOR

(75) Inventor: Shinichi Takizawa, Sakai (JP)

(73) Assignee: Shimano Inc., Osaka (JP)

(*) Notice: Subject to any disclaimer, the term of this patent is extended or adjusted under 35 U.S.C. 154(b) by 0 days.

(21) Appl. No.: 09/457,853

(22) Filed: Dec. 10, 1999

(51) Int. Cl.$^7$ ....................................................... F16C 1/10
(52) U.S. Cl. ........................ 188/24.11; 74/489; 74/502.4; 74/502.6; 74/502.2
(58) Field of Search ............................... 188/24.11, 24.14, 188/24.15, 2 D; 74/489, 502.2, 502.4, 502.6

(56) References Cited

U.S. PATENT DOCUMENTS

| | | | |
|---|---|---|---|
| 4,351,418 | 9/1982 | Woodring et al. | 188/24.22 |
| 4,756,542 * | 7/1988 | Yang | 280/278 |
| 4,823,915 | 4/1989 | Nagano | 188/2 D |
| 5,134,897 * | 8/1992 | Romano | 74/489 |
| 5,448,927 * | 9/1995 | Lumpkin | 74/502.2 |
| 5,660,082 * | 8/1997 | Hsieh | 74/502.2 |
| 5,924,328 | 7/1999 | Okajima et al. | 74/489 |
| 6,047,611 * | 4/2000 | Warren et al. | 74/489 |
| 6,152,266 * | 11/2000 | Takizawa | 188/24.21 |

FOREIGN PATENT DOCUMENTS

| | | |
|---|---|---|
| 9203082 | 6/1992 | (DE) . |
| 709284 A | 5/1996 | (EP) . |
| 5016865 | 10/1991 | (JP) . |
| 9118286 | 6/1997 | (JP) . |

* cited by examiner

Primary Examiner—Douglas C. Butler
Assistant Examiner—Xuan Lan Nguyen
(74) Attorney, Agent, or Firm—Shinjyu Global IP Counselors, LLP (57) ABSTRACT

A braking power modulator is coupled to the brake lever of a brake operating device for easy adjustment and viewing. The braking power modulator is preferably adjustable to provide different braking powers for different riders or different road conditions. The braking power modulator basically includes a mounting member, a brake lever, a biasing member, a modulating member and an adjusting member. The mounting member is adapted to be coupled to a handlebar of a bicycle, and has a cable passageway with a first abutment and a second abutment. The brake lever is pivotally coupled to the mounting member, and has a cable attachment portion. The biasing member is disposed in the cable passageway, and has first and second portions with the first portion of the biasing member being operatively coupled to the first abutment. The modulating member with the adjusting member coupled thereto is movably arranged within the cable passageway and operatively biased against the second abutment by the second portion of the biasing member. The adjusting member is movably arranged along the modulating member and biased toward the second abutment of the mounting member. A cable tensioning member is adjustably coupled to the modulating member. The biasing member is disposed in the tubular portion of the brake lever under a preloaded state with a pre-set compression force. The adjusting member engages the biasing member to change the pre-set compression force of the biasing member without changing the predetermined modulator stroke of the second blocking portion.

34 Claims, 9 Drawing Sheets

BRAKE OPERATING DEVICE WITH MODULATOR

BACKGROUND OF THE INVENTION

1. Field of the Invention

This invention generally relates to a braking power modulator for a bicycle brake device. More specifically, the present invention relates to a brake operating device with a braking power modulator coupled thereto. Preferably, the present invention relates to an adjustable braking power modulator that provides different braking powers to meet the needs of different riders or different road conditions.

2. Background Information

Bicycling is increasingly becoming a more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle brake and its brake operating device. The bicycle brake has been redesigned over the years to provide the rider with increased braking power. However, this increased braking power may be difficult for the inexperienced rider to control. Specifically, a bicycle brake with a very large braking power can possibly cause the bicycle wheel to lock up. This may cause the bicycle to skid for the inexperienced rider.

In order to assist inexperienced riders in operating a bicycle brake, a braking power modulating device has been developed to provide the inexperienced rider with more control over the braking action. The braking power modulating device is typically added to the brake cable between the brake lever and the bicycle brake device. An example of a braking power modulator that has been proposed is disclosed in U.S. Pat. No. 4,823,915, which issued on Apr. 25, 1989. In addition, other solutions have been proposed, such as that disclosed U.S. Pat. No. 4,351,418, which issued on Sep. 28, 1982.

In the past, the prior art modulators were typically constructed to be mounted on the brake cable adjacent to the brake device as seen in U.S. Pat. Nos. 4,823,915 and 4,351,418. This arrangement does not allow the rider to view the operation of the modulator. Moreover, the rider would have to get off the bicycle to adjust the modulator. While some prior art modulators were mounted adjacent the brake operating device, these prior art modulators suffer from various disadvantages. For example, some prior art modulators were difficult or time consuming to install. Moreover, some prior art modulators were not adjustable. In addition, some prior art modulators were expensive to manufacture.

In view of the above, there exists a need for a braking power modulator that can be easily assembled and viewed during normal riding conditions. This invention addresses these needs in the art, along with other needs, which will become apparent to those skilled in the art once given this disclosure.

SUMMARY OF THE INVENTION

One object of the present invention is to provide a brake operating device with a braking power modulator that is relatively easy to attach to a conventional brake cable.

Another object of the present invention is to provide a brake operating device with a braking power modulator in which a cable with a cable nipple can pass through the bore of the modulator and be attached to the cable hook of the brake lever without having to remove the outer casing from the inner wire.

Another object of the present invention is to provide a brake operating device with a braking power modulator, which is adjustable to provide different braking powers for different riders or different road conditions, and which has an indicator for displaying the current setting of the modulator.

Yet another object of the present invention is to provide a brake operating device with a braking power modulator for a bicycle that is highly reliable.

Still another object of the present invention is to provide a brake operating device with a braking power modulator for a bicycle, in which adjustment of a pre-set compression force of a biasing member does not change the predetermined modulator stroke.

A further object of the present invention is to provide a brake operating device with a braking power modulator that is relatively inexpensive to manufacture.

Some of the foregoing objects of the present invention can be attained by providing a braking power modulator for a bicycle brake operating device. The brake operating device comprises a mounting member, a brake lever, a biasing member, a modulating member and an adjusting member. The mounting member is adapted to be coupled to a handlebar. The mounting member has a cable passageway with a first abutment and a second abutment. The brake lever is pivotally coupled to the mounting member, and has a cable attachment portion. The biasing member is disposed in the cable passageway, and has first and second portions with the first portion of the biasing member being operatively coupled to the first abutment. The modulating member is movably arranged within the cable passageway and operatively biased against the second abutment by the second portion of the biasing member. The adjusting member is movably arranged along the modulating member and biased toward the second abutment of the mounting member.

Moreover, some of the foregoing objects of the present invention can further be attained by providing a brake operating device having a mounting member, a brake lever, a modulating member, a biasing member and a cable tensioning member. The mounting member is adapted to be coupled to a handlebar, and has a cable passageway with a first abutment and a second abutment. The brake lever is pivotally coupled to the mounting member, and has a cable attachment portion. The modulating member is movably arranged within the cable passageway between the first and second abutments. The modulating member has a first cable receiving bore extending longitudinally therethrough. The biasing member is disposed in the cable passageway, and has a first portion operatively coupled to the first abutment and a second portion operatively coupled to the modulating member to operatively bias the modulating member against the second abutment. The cable tensioning member is adjustably coupled to the modulating member, and has a second cable receiving bore extending longitudinally therethrough and a longitudinal slit connected to said second cable receiving bore.

In one simplified aspect of the present invention, an inexpensive brake operating device with an integrated mounting modular can be provided in accordance with the present invention. More specifically, brake operating device is provided with a mounting member, a brake lever, a biasing member and a modulating member. The mounting member is adapted to be coupled to the handlebar and has a cable passageway with a first abutment. The brake lever is pivotally coupled to the mounting member, and has a cable attachment portion. The biasing member is disposed in the cable passageway. The biasing member has first and second portions with the first portion operatively coupled to the first abutment. The modulating member is movably arranged within the cable passageway with the second portion of the biasing member operatively coupled to the modulating member to operatively bias the modulating member. The modulating member can have a step-shape bore for directly receiving the inner wire of the cable therethrough, and to abut against the outer casing of the brake cable. In this simplified embodiment, the adjustment mechanism (e.g., cable tensioning bolt and cable tensioning nut) can be eliminated. Moreover, the adjustment mechanism can also be eliminated in this embodiment.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
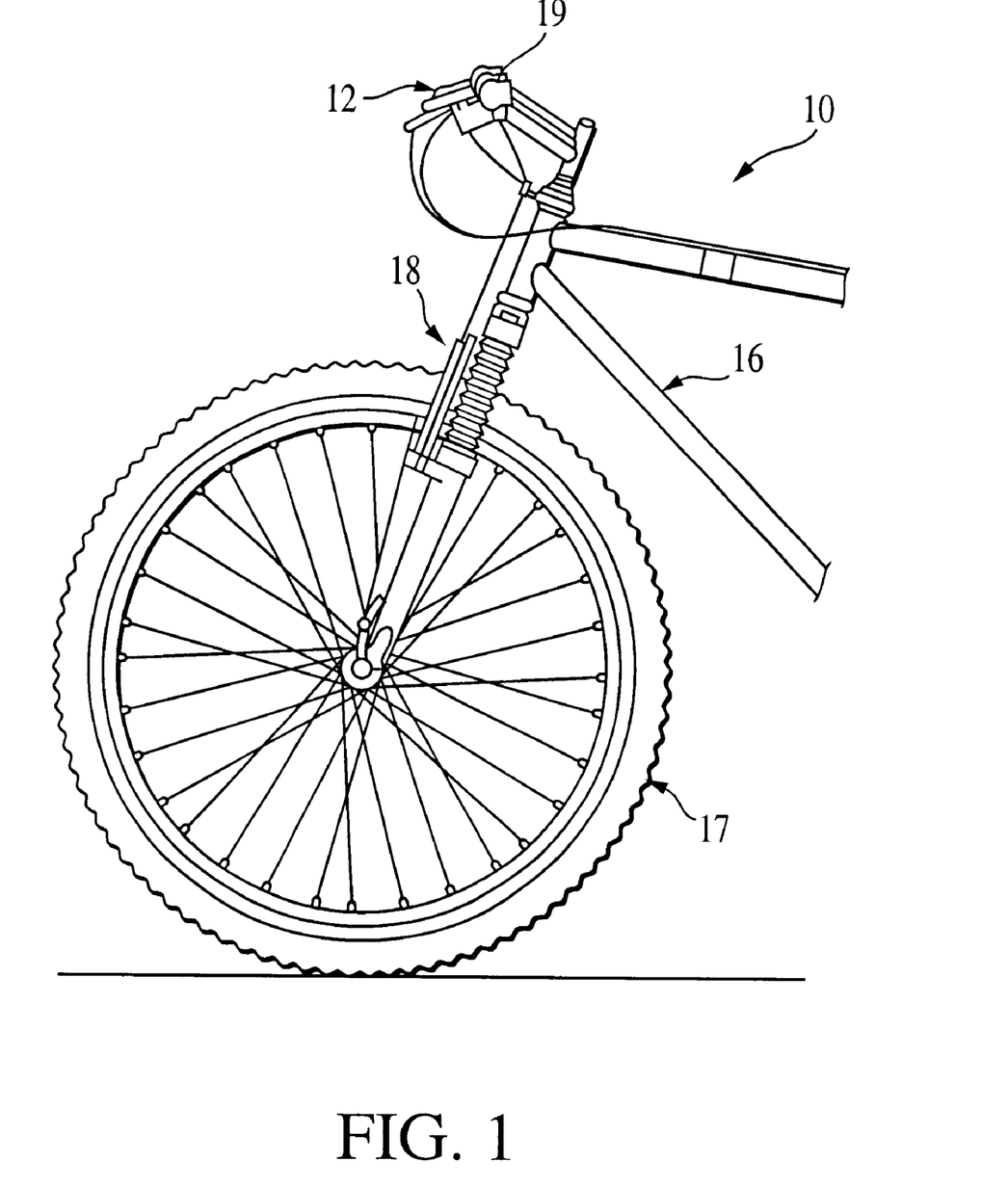
FIG. 1 is a partial side elevational view of a front portion of a bicycle with a bicycle brake operating device installed thereon in accordance with the present invention.
Figure 2:
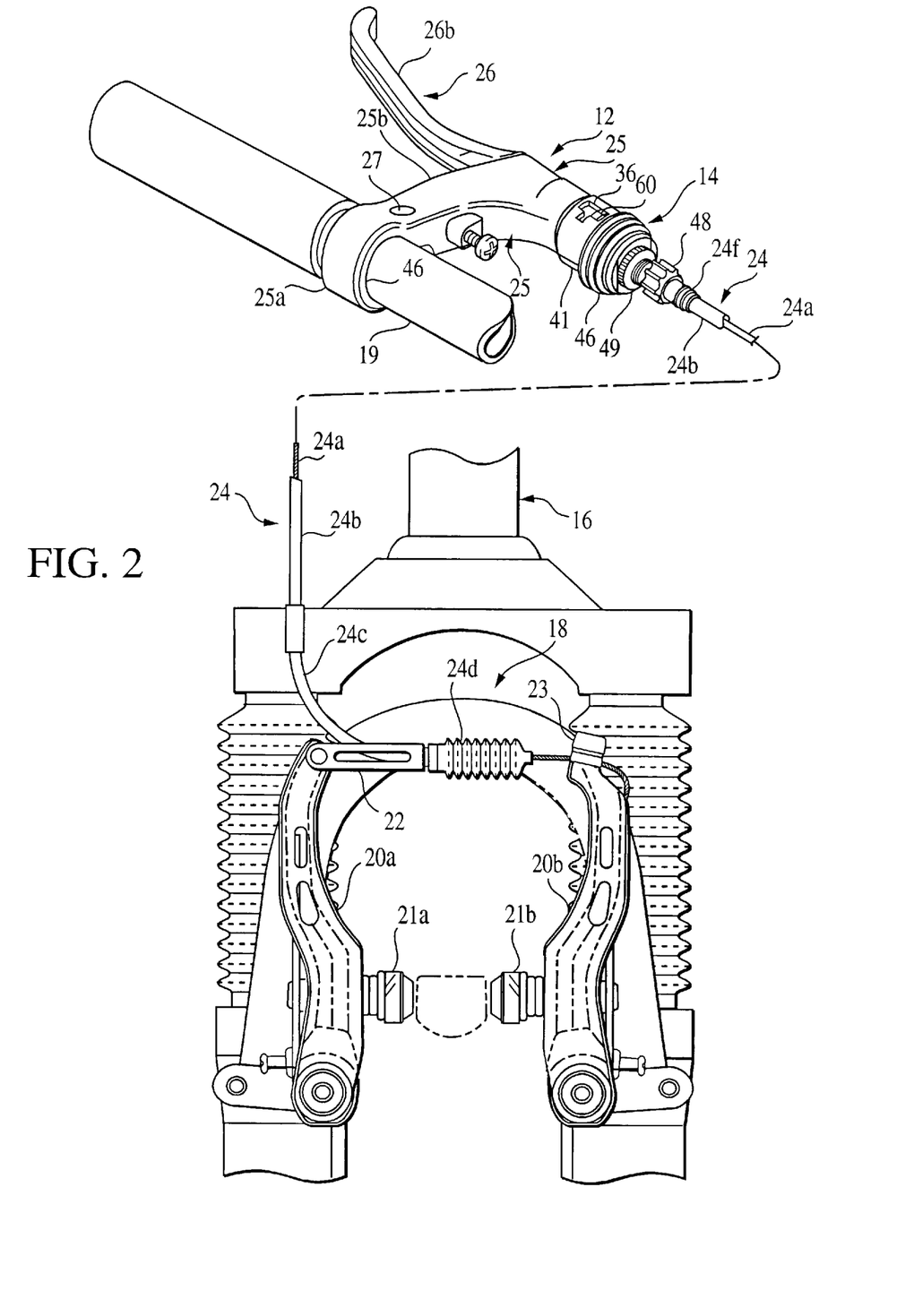
FIG. 2 is a top perspective view of the bicycle brake operating device with a braking power modulator installed on the handlebar of the bicycle in accordance with the present invention and an elevational view of the brake device coupled to the brake operating device by a control cable.

Referring initially to FIGS. 1 and 2, a bicycle 10 is illustrated having a bicycle brake operating device 12 with an integrated braking power modulator 14 (See FIG. 2) installed on bicycle 10 in accordance with one embodiment of the present invention. Bicycle 10 is preferably a conventional bicycle with a bicycle frame 16, a pair of wheels 17 (only front wheel shown), a pair of brakes 18 (only front brake shown) and a handlebar 19 with a pair of the brake operating devices 12 (only front brake shown) coupled thereto. Bicycle 10 also has a conventional drive train component for propelling bicycle 10. Bicycle 10 and its various components are well known in the art. Thus, bicycle 10 and its various components will not be discussed or illustrated in detail herein, except as needed to explain the present invention.

As seen in FIG. 2, the brake operating device 12 is operatively coupled to the brake device 18 by a control cable 24 according to the present invention. Brake device 18 is a cantilever type of a brake device that is mounted on the front fork of bicycle frame 16 in a conventional manner. The bicycle brake device 18 achieves a braking effect by brake cable 24 pulling the upper ends of brake arms 20a and 20b together, which in turn presses brake shoes 21a and 21b against side surfaces of the rim of the bicycle wheel 17. Of course, it will be apparent to those skilled in the art that brake operating device 12 with braking power modulator 14 can be used to control other types of brake devices. Since brake devices, such as the brake device 18, are currently available on the market, the brake device 18 will not be described in detail.

Brake arms 20a and 20b of the brake device 18 are pivotally supported on a front fork of bicycle frame 16. The brake arm 20a of the brake device 18 is connected at an upper end to the brake cable 24 by a connecting arm 22, which is pivotally coupled to the upper end of the brake arm 20a. The brake arm 20b of the brake device 18 is connected at an upper end to the brake cable 24 by a screw 23.

As seen in FIG. 2, the control cable 24 operatively couples the brake operating device 12 to the brake device 18. The braking power modulator 14 is integrated with brake operating device 12 to modulate a braking power corresponding to a stroke of the brake cable 24. In this preferred embodiment, the braking power modulator 14 is adjustable to vary the application of the braking power of brake device 18. Preferably, the braking power modulator 14 has a constant overall stroke regardless of the setting of the braking power modulator 14. In other words, the length of the modulator stroke of braking power modulator 14 does not vary when the modulator settings are changed.

Figure 3:
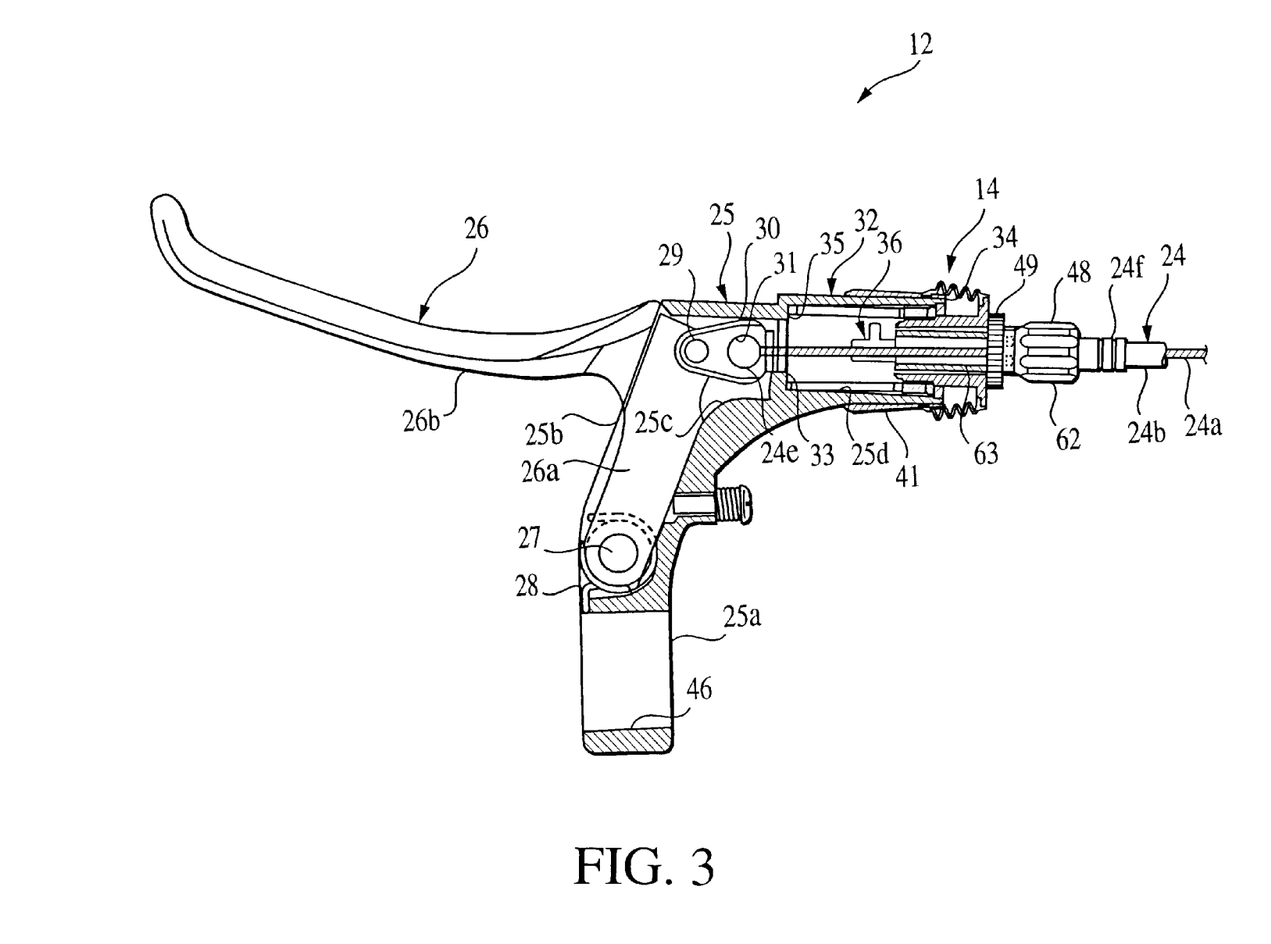
FIG. 3 is a cross-sectional view of the brake operating device and the integrated braking power modulator illustrated in FIG. 2 in accordance with the present invention.
Figure 4:
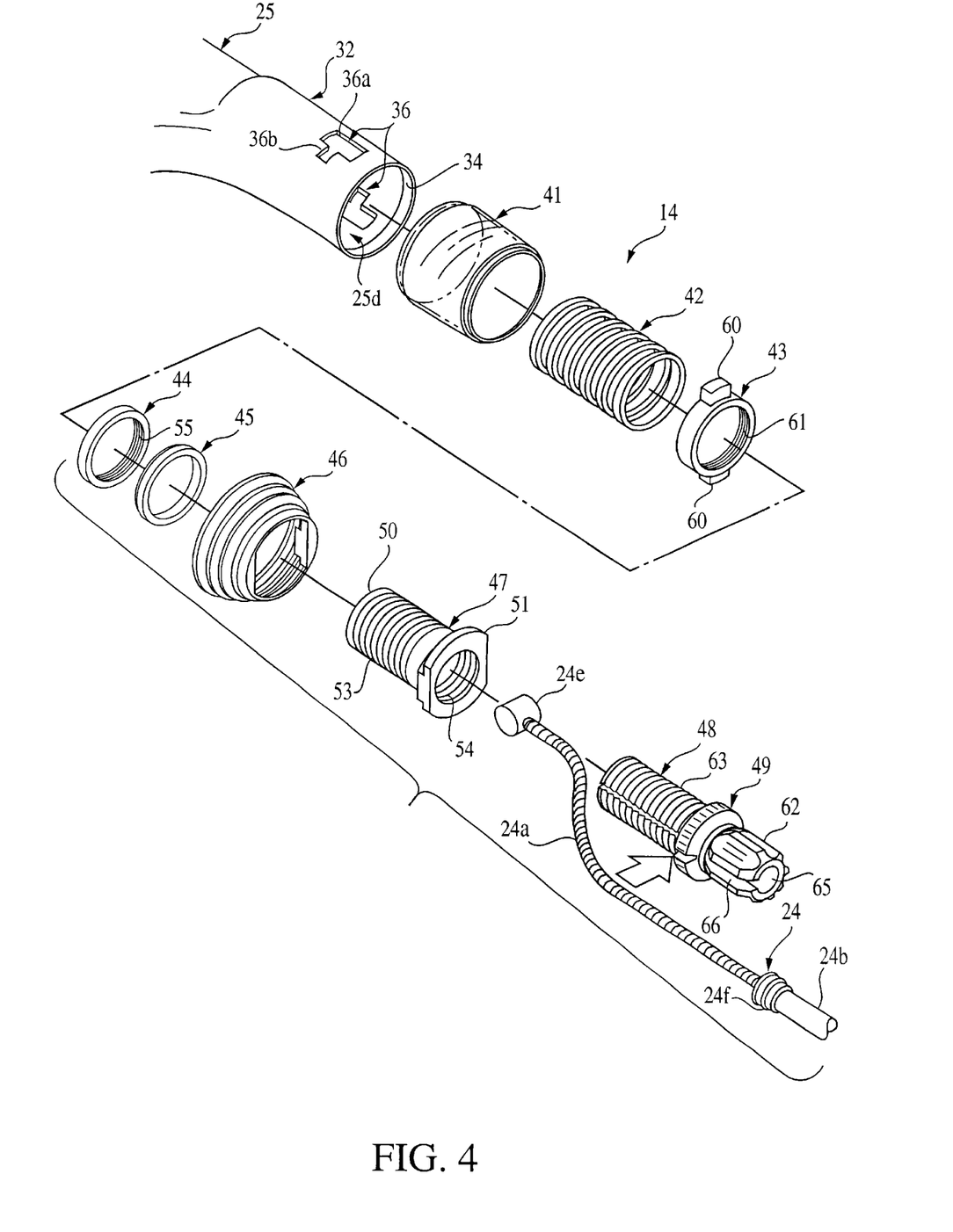
FIG. 4 is a partial exploded top perspective view of the brake operating device and the integrated braking power modulator illustrated in FIGS. 2 and 3 in accordance with the present invention.

Brake cables, such as the brake cable 24 used between brake operating device 12 and brake device 18, are currently available on the market, and thus, the brake cable 24 will not be described in detail. As best seen in FIG. 2, brake cable 24 is a conventional cable that basically comprises an inner wire 24a and an outer casing 24b overlying a center section of the inner wire 24a. When brake cable 24 is used with a cantilever type of brake or the like, an inner wire guiding tube 24c and a telescopic protecting sheath 24d are used at the end of brake cable 24 that is attached to brake device 18. The inner wire 24a is preferably made of thin steel wires that are wound together to form a wire cable having an outer diameter of approximately 1.6 millimeters. A cable nipple 24e is provided at the end of the inner wire 24a that is coupled to the brake operating device 12 as discussed below. The cable nipple 24e has a width that is typically at least twice the diameter of the inner wire 24a, e.g., 3.2 millimeters, or greater. In the illustrated example, the cable nipple 24e is a cylindrical member with a diameter of approximately 6 millimeters to 7 millimeters and a length of approximately 6 millimeters to 7 millimeters as seen in FIGS. 3 and 4. The outer casing 24b preferably has an inner layer made of metal and an outer layer made of resin. The outer casing 24b is a tubular member with an inner diameter that is slightly larger than the diameter of the inner wire 24a so that the inner wire 24a can slide freely within the outer casing 24b. The outer diameter of outer casing 24b is approximately 5.0 millimeters. The end/ends of the outer casing 24b can be provided with outer casing caps 24f if needed and/or desired. The inner wire guiding tube 24c is preferably made of metal, such as aluminum, and has a plastic liner (not shown). The telescopic protecting sheath 24c is preferably made of rubber.

One end of inner wire 24a of a brake cable 24 is connected at an upper end of the brake arm 20b of the brake device 18 by the screw 23. The other end of the inner wire 24a is connected in a conventional manner via the nipple 24e to the brake operating device 12 that is provided on the handlebar 19 as seen in FIGS. 2 and 3. One end of the outer casing 24b is operatively coupled to modulator 14, while the other end of the outer casing 24b is operatively coupled to inner wire guiding tube 24c. The inner wire guiding tube 24c contacts the connecting arm 22 of the brake arm 20a. The protecting sheath 24d is mounted around the inner wire 24a and disposed adjacent to the connecting arm 22.

As best seen in FIG. 3, brake operating device 12 basically includes a lever bracket or mounting member 25 and a brake lever 26 pivotally coupled to bracket 25 by a pivot pin 27. Accordingly, brake lever 26 moves relative to bracket 25 between a release position and a braking position. A return spring 28 is operatively coupled between bracket 25 and brake lever 26 to bias brake lever 26 against bracket 25 to its release position.

Turning now to FIG. 3, brake lever 26 has a mounting portion 26a pivotally coupled to bracket 25, and a hand portion 26b extending outwardly from mounting portion 26a. Mounting portion 26a has a pin 29 that attaches a conventional cable hook 30 thereto. Pin 29 and cable hook 30 form a cable attachment portion for brake lever 26. The cable hook 30 has an opening 31 that receives cable nipple 24e therein to couple the inner wire 24a to brake lever 26. Of course, cable 24 can be attached directly to mounting portion 26a of brake lever 26.

Bracket 25 has a clamping portion 25a and a cable attachment portion 25b with braking power modulator 14 integrated therewith. Clamping portion 25a has an opening 46 for receiving handlebar 19 therein. Clamping portion 25a is an annular member that has a longitudinal split (not shown) such that the clamping portion 25a can be squeezed about handlebar 19 via a clamping bolt (not shown). Since clamping portion 25a is relatively conventional, it will not be discussed or illustrated in detail herein.

Still referring to FIG. 3, the cable attachment portion 25b has a lever receiving recess 25c and a cable passage 25d formed therein. The cable passage 25d of the cable attachment portion 25b forms a tubular portion 32 in which modulator 14 is mounted.

Figure 7:
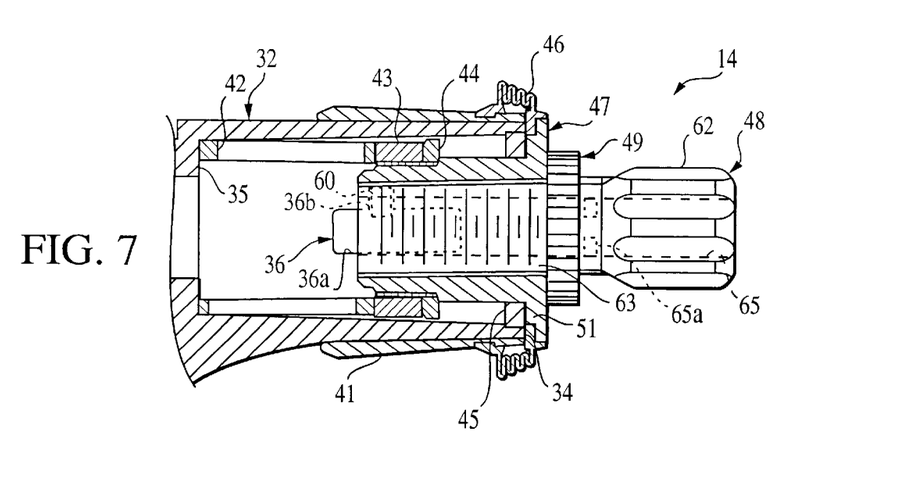
FIG. 7 is a partial cross-sectional view of the brake operating device and the integrated braking power modulator illustrated in FIGS. 2–6 in accordance with the present invention, with the modulator in a locked position.

Tubular portion 32 has a first open end 33 and a second open end 34 that is longitudinally spaced from first open end 33. An inner abutment surface 35 is formed at the first open end 33 for limiting movement of modulator 14 therein. Tubular portion 32 has a pair of T-shaped openings or slots 36 that are spaced 180° apart as seen in FIG. 4. The slots or openings 36 are utilized to control movement of modulator 14, as well as to cooperate with modulator 14 to maintain modulator 14 in a locked or inoperative position (FIG. 7), as discussed below. Slots 36 each include a longitudinal section 36a and a transverse section or notch 36b.

Moreover, the T-shaped elongated slots or openings 36 are also used for viewing the setting of braking power modulator 14. Indicia can be provided on the side wall of tubular portion 32 to indicate the setting of braking power modulator 14. In the illustrated embodiment, three settings are provided on tubular portion 32, e.g., L (low) and H (high) and LOCK. Of course, other types of indicia can be used, such as a scale with kilograms.

As shown in FIG. 4, the tubular portion 32 of mounting bracket 25 forms the housing for the braking power modulator 14. Accordingly, the braking power modulator 14 is integrated with the brake operating device 12. The braking power modulator 14 basically includes a transparent cover 41, a biasing member or spring 42, an adjusting nut or member 43, a preload nut or member 44, a preload cap or member 45, a sealing member 46, a modulating bolt or member 47, a cable tensioning bolt 48 and a cable tensioning nut 49.

The braking power modulator 14 is adjustable to provide different braking powers for different riders or different road conditions. Once the brake shoe clearance is fixed, the overall cable stroke for the brake device 18 is also fixed regardless of the setting of the braking power modulator 14.

Figure 5:
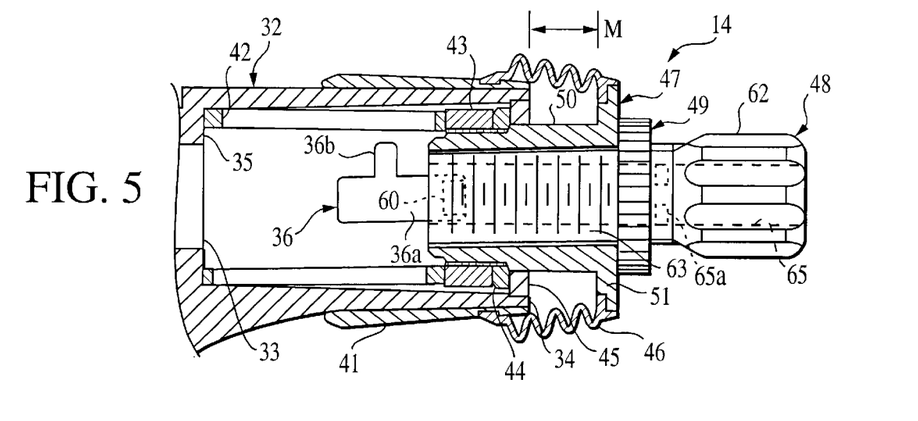
FIG. 5 is a partial cross-sectional view of the brake operating device and the integrated braking power modulator illustrated in FIGS. 2–4 in accordance with the present invention, with the modulator in an uncompressed position.
Figure 8:
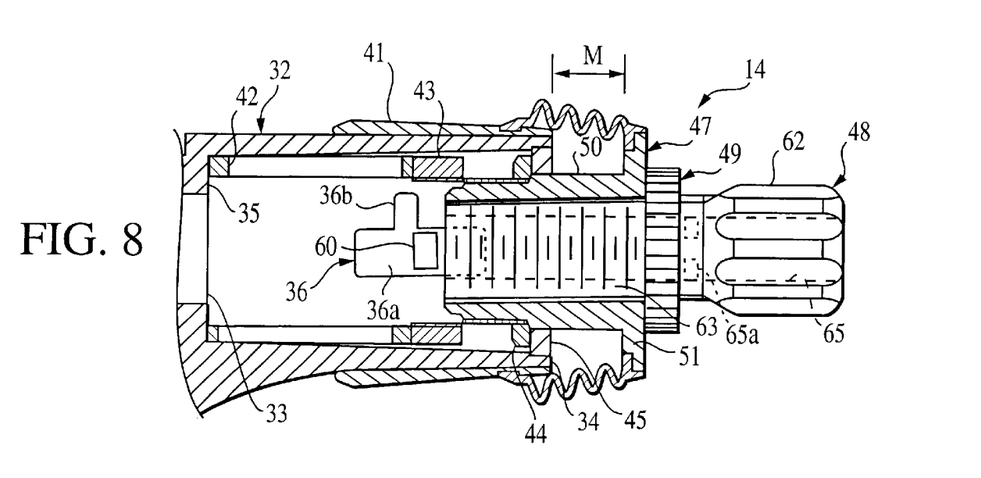
FIG. 8 is a partial cross-sectional view of the brake operating device and the integrated braking power modulator illustrated in FIGS. 2–7 in accordance with the present invention, with the modulator at maximum modulation in the uncompressed position.
Figure 9:
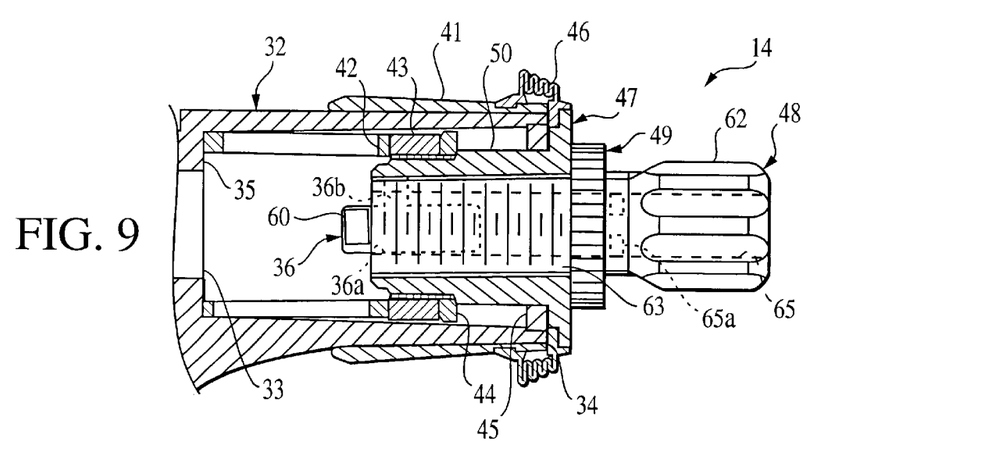
FIG. 9 is a partial cross-sectional view of the brake operating device and the integrated braking power modulator illustrated in FIGS. 2–8 in accordance with the present invention, with the modulator at maximum modulation in the compressed position.

In other words, braking power modulator 14 is designed so that the overall cable stroke does not change when the braking power modulator 14 is adjusted. This is accomplished by providing a constant modulator stroke M between the tubular portion 32 and modulating member 47, as seen in FIGS. 5 and 8. Alternatively, a constant modulator stroke can be obtained by slots 36a, which engages adjusting nut 43 to control the modulator stroke. Preferably, modulator stroke M is approximately seven millimeters of the overall cable stroke.

Referring now to FIGS. 5–9, longitudinal sectional views of the tubular portion 32 are illustrated that show the detailed structure of the braking power modulator 14 of the present invention. The modulating member 47 with the adjusting member 43 coupled thereto is movably disposed within tubular portion 32 adjacent the second open end 34. The biasing member 42 is also movably disposed within tubular portion 32 between the inner abutment surface 35 and the adjusting nut or member 43 for biasing modulating member 47 outwardly relative to tubular portion 32. In order to have a smooth movement of the modulating member 47 and a smooth expansion and compression of the biasing member 42 within tubular portion 32, the interior of the tubular portion 32 is preferably coated with a lubricating oil (not shown).

The transparent cover 41 is a tubular member that is fixedly secured to the outer surface of the side wall of tubular portion 32. The transparent cover 41 seals slots 36 to prevent dirt or other contaminants from entering the tubular portion 32.

The modulating bolt or member 47 is in the form of a preloaded adjusting bolt that is adjustably coupled to the adjusting nut or member 43. The modulating bolt 47 is movably mounted within the tubular portion 32 for axial movement within the tubular portion 32 along a predetermined modulator stroke M. The biasing member 42 urges the modulating member 47 towards the second open end 34 of the tubular portion 32. Thus, modulating member 47 moves axially within the tubular portion 32 against the force of the biasing member 42. The force of the biasing member 42 on the modulating member 47 (preloaded adjusting bolt) is varied by changing the relative position of the adjusting nut or member 43 along the modulating member 47. The modulating member 47 is a hollow cylindrical body that is preferably made of a hard resin material or aluminum.

The modulating member 47 has a tubular section 50 and an annular abutment flange 51 extending radially and outwardly from the tubular section 50. The tubular section 50 has external threads 53 and internal threads 54 as seen in FIG. 4. The external threads 53 of the modulating member 47 are threadedly engaged with the adjusting nut 43 so that the modulating member 47 moves axially relative to adjusting nut 43 upon rotation of the modulating member 47. The internal threads 54 of modulating member 47 are threadedly engaged with the cable tensioning bolt 48 so that rotation of the cable tensioning bolt 48 causes axial displacement of the cable tensioning bolt 48 relative to the modulating member 47.

The internal cable receiving bore formed by internal threads 54 of modulating member 47 preferably has an inner diameter that is sized to permit the cable nipple 24e to freely pass therethrough. This allows the inner wire 24a of brake cable 24 to be easily attached to brake lever 26 without removing the outer casing 24b. In the illustrated example, the internal cable receiving bore of the modulating member 47 has an inner diameter of at least six millimeters. Of course, if the cable nipple 24e is smaller, the internal cable receiving bore of the modulating member 47 can be smaller. For example, the cable nipple 24e is preferably at least twice the diameter of the inner wire 24a, and thus, the cable receiving bore of the modulating member 47 is preferably larger than at least twice the diameter of the inner wire 24a.

Prior to compression of modulator 14, a portion of the modulating member 47 protrudes out of the opening in the second open end 34 of the tubular portion 32. The abutment flange 51 of the modulating member 47 has a pair of parallel flat surfaces so that the modulating member 47 can be rotated about its longitudinal axis.

The adjusting nut 43 threaded onto the external threads 53 of the modulating member 47. The biasing member 42 engages the adjusting nut 43 to urge the modulating member 47 towards the second open end 34 of the tubular portion 32. Thus, the preload nut 44 contacts the preload cap 45 of the second open end 34 of the tubular portion 32 to limit outward movement of modulating member 47. The force of the biasing member 42 on the modulating member 47 (bolt preloaded adjusting) is varied by changing the relative position of the adjusting nut or member 43 along the modulating member 47, as discussed below.

Figure 12:
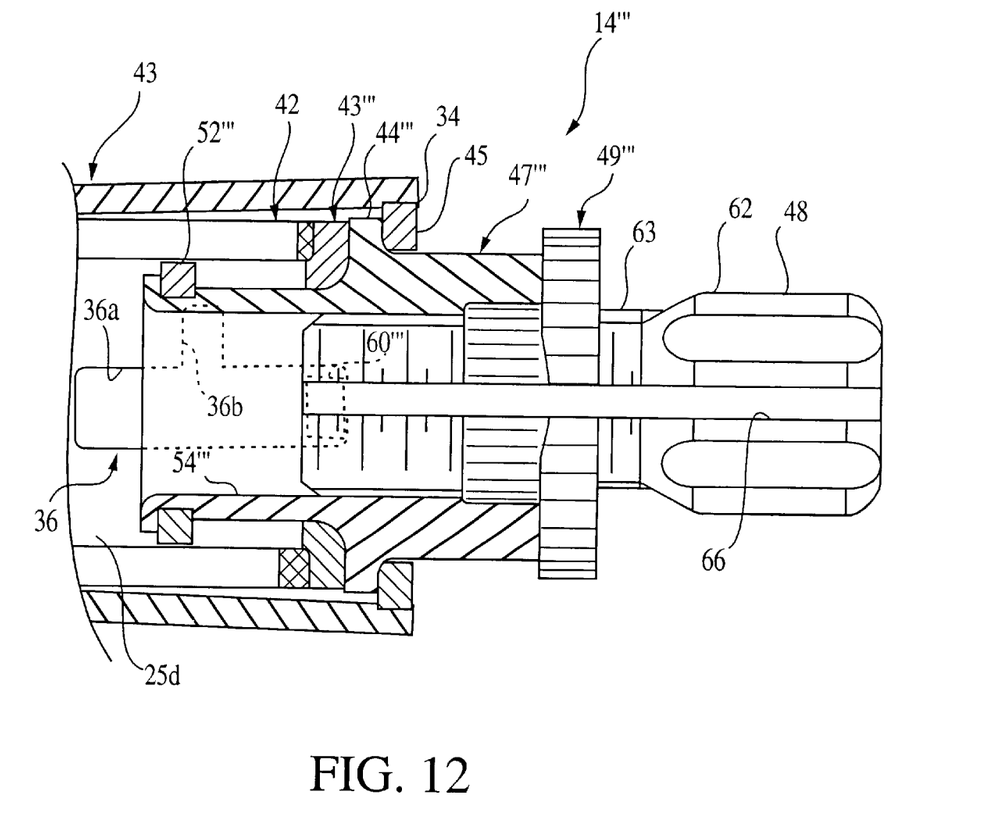
FIG. 12 is a partial cross-sectional view of a modified brake operating device with an integrated braking power modulator in accordance with a fourth embodiment of the present invention.

The preload nut or member 44 is a ring-shaped member having internal threads 55 as seen in FIG. 4. The preload nut 44 is fixedly secured to tubular section 50 of the modulating member 47. In particular, internal threads 55 of preload nut 44 are threadedly engaged with external threads 53 of the modulating member 47. Preferably, preload nut 44 is fully threaded to the end of external threads 53 so that preload nut 44 forms an annular abutment or stopper on tubular section 50 of the modulating member 47. It is possible to construct preload nut 44 as a locking nut that could be positioned at any desired axial location along tubular section 50 of modulating member 47. Alternatively, preload nut 44 can be integrally formed with tubular section 50 of the modulating member 47 as a one-piece, unitary member. This alternative embodiment is illustrated in FIG. 12, which is discussed below.

As mentioned above, preload nut 44 forms an annular stopper for modulating member 47. Specifically, preload nut 44 is urged toward preload cap 45 by biasing member 42. Accordingly, outward movement of modulating member 47 is limited by preload nut 44 engaging preload cap 45, as seen in FIGS. 5 and 8.

The preload cap 45 is fixedly secured within tubular portion 32 to form an annular abutment flange or surface. Thus, abutment surface 35 and preload cap 45 form first and second abutments, respectively, of tubular portion 32. The modulating member 47 is movably disposed adjacent to the second open end 34 and within the tubular portion 32. Thus, modulating member 47 is prevented from falling out of the second open end 34 of the tubular portion 32 due to the preload nut abutting against the preload cap 45.

One end of the biasing member 42 engages the adjusting member 43, while the other end of the biasing member 42 engages the abutment surface 35 to normally hold the modulating member 47 against the preload cap 45 of second open end 34.

The biasing member 42 is preferably a coil spring that is disposed in the tubular portion 32 between the adjusting nut 43 and the abutment surface 35 of tubular portion 32 such that biasing member 42 is under a preloaded state with a pre-set compression force. The biasing member 42 is preferably made of steel. The biasing member 42 has an outer diameter slightly smaller than the inner diameter of the tubular portion 32. The inner diameter of biasing member 42 is slightly greater than an outer diameter of the tubular section 50 of the modulating member 47. One end of the biasing member 42 engages the abutment surface 35 of the tubular portion 32. The other end of the biasing member 42 engages the adjusting nut 43 to normally hold the modulating member 47 against the preload cap 45 of second open end 34.

The adjusting member or nut 43 is located within the tubular portion 32 and is adjustably coupled along the longitudinal length of the tubular section 50 of the modulating member 47. The adjusting nut 43 has a pair of control tabs 60 extending outwardly in opposite directions, i.e., 180° apart as seen in FIGS. 4–9. The control tabs 60 are slidably received within the slots or openings 36. The control tabs 60 serve three functions. First, control tabs 60 limit adjusting nut 43 from rotating within the tubular portion 32. Second, control tabs 60 act as indicating members to display the amount of compression of the biasing member 42. In other words, the setting of braking power modulator 14 is determined by the location of control tabs 60 within the slots or openings 36. Third, the control tabs 60 engage the notch or transverse section 36b of the slots or openings 36 to lock modulator 14 to effectively eliminate modulator 14 from operating during braking. As mentioned above, indicia is preferably applied to the side wall of tubular portion 32 to indicate the setting of braking power modulator 14. In the illustrated embodiment, three settings are provided on tubular portion 32, e.g., L (low) and H (high) and LOCK.

The adjusting nut 43 engages the biasing member 42 to change the pre-set compression force of the biasing member 42 without changing the predetermined modulator stroke of modulator 14. Specifically, the adjusting nut 43 has a threaded bore 61 (FIG. 4) that threadedly engages the external threads 53 of the first section 50 of the modulating member 47 for threadedly coupling the adjusting nut 43 thereto. Thus, rotating the modulating member 47 causes the adjusting nut 43 to move axially within the tubular portion 32. As the adjusting nut 43 moves towards the inner end of tubular portion 32, the biasing member 42 is compressed. In other words, the force of the biasing member 42 on the modulating member 47 (bolt preloaded adjusting) is varied by changing the relative position of the adjusting nut 43 along the modulating member 47. During this movement of the adjusting nut 43 and the compression of the biasing member 42, the preload cap 45 and modulating member 47 remain stationary in the axial direction. In other words, the relative positions of the preload cap 45 and modulating member 47 do not change during compression of biasing member 42. Accordingly, the modulator stroke remains constant for each setting of braking power modulator 14.

The preload cap 45 that is fixedly coupled to the second open end 34 of the tubular portion 32. Preferably, the preload cap 45 is press-fitted into the second open end 34 of the tubular portion 32. Alternatively, the preload cap 45 is adhesively coupled within the second open end 34 of the tubular portion 32. Similar to the modulating member 47, the preload cap 45 is a hollow cylindrical body made of a hard resin material or aluminum.

Figure 6:
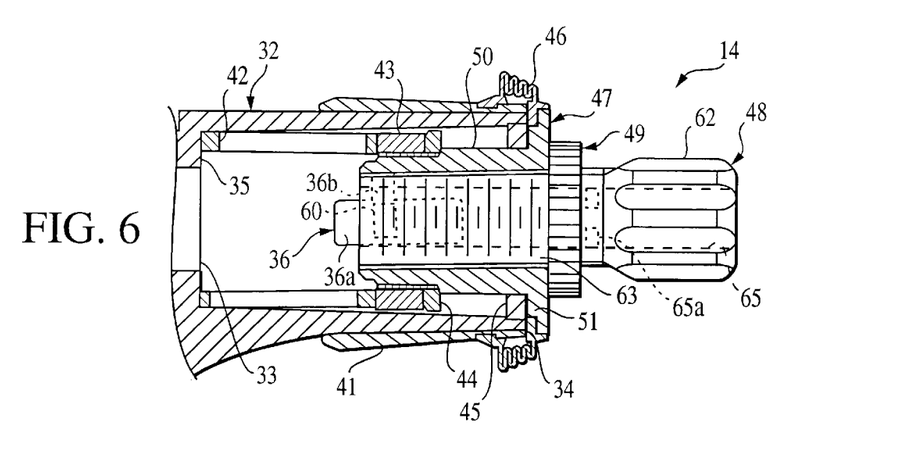
FIG. 6 is a partial cross-sectional view of the brake operating device and the integrated braking power modulator illustrated in FIGS. 2–5 in accordance with the present invention, with the modulator in a compressed position.

The sealing member 46 is an elastomeric bellows type of seal. In other words, sealing member 46 is a tubular member with a corrugated side wall that is constructed of a flexible and resilient elastomeric material. One end of the sealing member 46 is fixedly coupled to tubular portion 32 at second open end 34. The other end of sealing member 46 is fixedly coupled to abutment flange 51 of modulating member 47. As seen in FIGS. 5 and 6, as the modulating member 46 moves axially, the sealing member 46 is contracted and/or expanded.

The cable tensioning bolt 48 and the cable tensioning nut 49 are movably coupled to the modulating member 47. The tensioning bolt 48 is a relatively conventional part. The cable tensioning bolt 48 has a head portion 62 and a threaded section 63. The tensioning bolt 48 also has a cable receiving bore 65 extending axially therethrough, and an axially extending slot 66 that is in communication with cable receiving bore 65. The inner wire 24a can be easily inserted into the cable receiving bore 65 via slot 66. Accordingly, cable receiving bore 65 is sized to slidably receive inner wire 24a therein. Preferably, the cable receiving bore 65 is sized to receive either outer casing 24b or outer casing cap 24f therein and has an annular abutment 65a formed therein. The annular abutment 65a is designed to prevent axial movement of the outer casing 24b relative to tensioning bolt 48. Cable tensioning nut 49 is threadedly received on threaded section 62 for axial movement. In this embodiment, cable tensioning nut 49 is merely a locking nut that is used to prevent accidental rotation between cable tensioning bolt 48 and modulating member 47.

One possible way of assembling the braking power modulator 14 will now be described. First, the biasing member 42 is inserted into the tubular portion 32 through the second open end 34 so that one end of the biasing member 42 contacts abutment surface 35. Next, the adjusting member 43 is inserted into the tubular portion 32 through the open end 34. The tabs 60 of the adjusting nut 43 are now positioned in the slots or openings 36 of the tubular portion 32. In this position, biasing member 42 contacts the adjusting member 43 to preload or compress the biasing member 42. Preferably, the biasing member 42 is only slightly compressed to prevent rattling of the biasing member 42.

The preload cap 45 is now positioned over tubular section 50 of the modulating member 47. Next, the preload nut 44 is threaded onto external threads 53 of the modulating member 47. The preload cap 45 is now retained on modulating member 47 between the abutment flange 51 and the preload nut 44. The modulating member 47 with preload nut 44 and the preload cap located thereon is then inserted into the tubular portion 32 through the second open end 34 of the tubular portion 32. The modulating member 47 is then coupled to the adjusting nut 43 and the preload cap 45 is coupled to tubular portion 32. Specifically, the modulating member 44 is rotated so that external threads 53 are threadedly engaged with threads 61 of the adjusting nut 43. The preload cap 45 is fixedly secured in open end 34 of the tubular portion 32 to form an abutment wall to retain the modulating member 47 within tubular portion 32. Accordingly, the modulating member 47 is now located adjacent the second open end 34 with the annular abutment flange 51 of the modulating member 47 located outside of tubular portion 32

In this position, one end of the biasing member 42 engages the internal abutment 35, while the other end of the biasing member 42 engages the adjusting nut 43 to normally hold the modulating member 47 against the preload cap 45 which is secured within second open end 34. Thus, the biasing member 42 is in a compressed state. Biasing member 42 acts to move modulating member 47 outward until preload nut 44 contacts the now secure preload cap 45.

Now, the sealing member 46 is secured between tubular portion 32 and annular abutment flange 51 of the modulating member 47. Finally, the cable tensioning bolt 48 with cable tensioning nut 49 thereon is threaded into threaded bore 54 of modulating member 47. Thus, the assembling of the braking power modulator 14 is completed.

Next, the magnitude of a preloaded force applied to the biasing member 42 of the braking power modulator 14 of the present invention will be described. The preloaded force represents a retraction force needed to be applied to the inner wire 24a of the brake cable 24 to actuate a movement of the inner wire guiding tube 24c toward the outer casing 24b of the brake cable 24, when a rider grips the brake lever (not shown) to pull the inner wire 24a for braking operation.

Due to differences in the riders' weight, experience, preferences, etc., the desired gripping power varies among various riders. Thus, the braking power modulator 14 of the present invention is adjustable to accommodate various riders' needs. The biasing member 42 of the braking power modulator 14 of the present invention is preloaded such that it has a low preload force with a magnitude of approximately zero kilograms and a high preload force with a magnitude of approximately twenty kilograms.

A rider can continuously adjust the braking power modulator 14 to suit his/her weight, hand's gripping power and custom of operating the brake. For example, a rider whose weight is sixty kilograms can suitably select a braking power modulator 14 having a preloaded force of five kilograms. A rider whose weight is over sixty kilograms can suitably select a braking power modulator 14 having a preloaded force of ten kilograms. A rider whose weight is under sixty kilograms can select a modulator 14 having a preloaded force of approximately zero kilograms. Of course, the braking power modulator 14 illustrated and discussed in this disclosure can be continuously adjusted from a low preload force with a magnitude of approximately zero kilograms to the point in which the braking power modulator 14 is locked. When the braking power modulator 14 is locked, biasing member 42 cannot be compressed during movement of the inner wire 24*a*.

When a rider grips the brake lever 26 to pull the inner wire 24*a* of the brake cable 24 for braking operation, a tension (retraction force) is produced on the inner wire 24*a*. When the tension is greater than the preloaded force (for example, seven, ten or fourteen kilograms) applied to the biasing member 42 of the braking power modulator 14, the outer casing 24*b* is actuated to move the modulating member 47. Thus, the adjusting nut 43 and the modulating member 47 move together with the outer casing 24*b* and/or end cap 24*f* of the brake cable 24 toward the brake lever 26. Consequently, the adjusting nut 43 and the modulating member 47 compress the biasing member 42 within the tubular portion 32. Hence, a delay in the braking action can be achieved due to increased retraction stroke and retraction force of the inner wire 24*a* needed for the compression of the biasing member 42.

If the biasing member 42 of braking power modulator 14 is preloaded with a force of approximately seven kilograms, the braking force is rapidly increased at an initial braking stage, but then when the biasing member 42 begins to compress, the braking force is gradually increased at a slower rate. Once the inner ends of the abutment flange 51 of the modulating member 47 contact the preload cap 45 and second end 34, the biasing member 42 can no longer be compressed. Thus, the rate of the braking force begins to rapidly increase again at the final stage of the cable stroke. If the biasing member 42 of braking power modulator 14 is preloaded with a higher force, the braking power modulator 14 will not take effect as soon in the cable stroke. In other words, the initial braking stage will be longer such that a greater braking force can be applied to the rim before the braking power modulator 14 takes effect to decrease the rate of the braking force in relation to the cable stroke.

It will be apparent to those skilled in the art that the braking power modulator 14 of the present invention will help to prevent an overly early lock of the rim by the brake shoes. During the buffering stroke, a rider still obtains a braking effect and hence a good brake control feeling. The rider can comfortably carry out the brake control without having to depend on professional control skills and thus can enjoy the ride. The overly early lock of the rim of the wheel by the brake shoes and the failure of the brake control are effectively prevented, especially in a downhill ride.

SECOND EMBODIMENT

Figure 10:
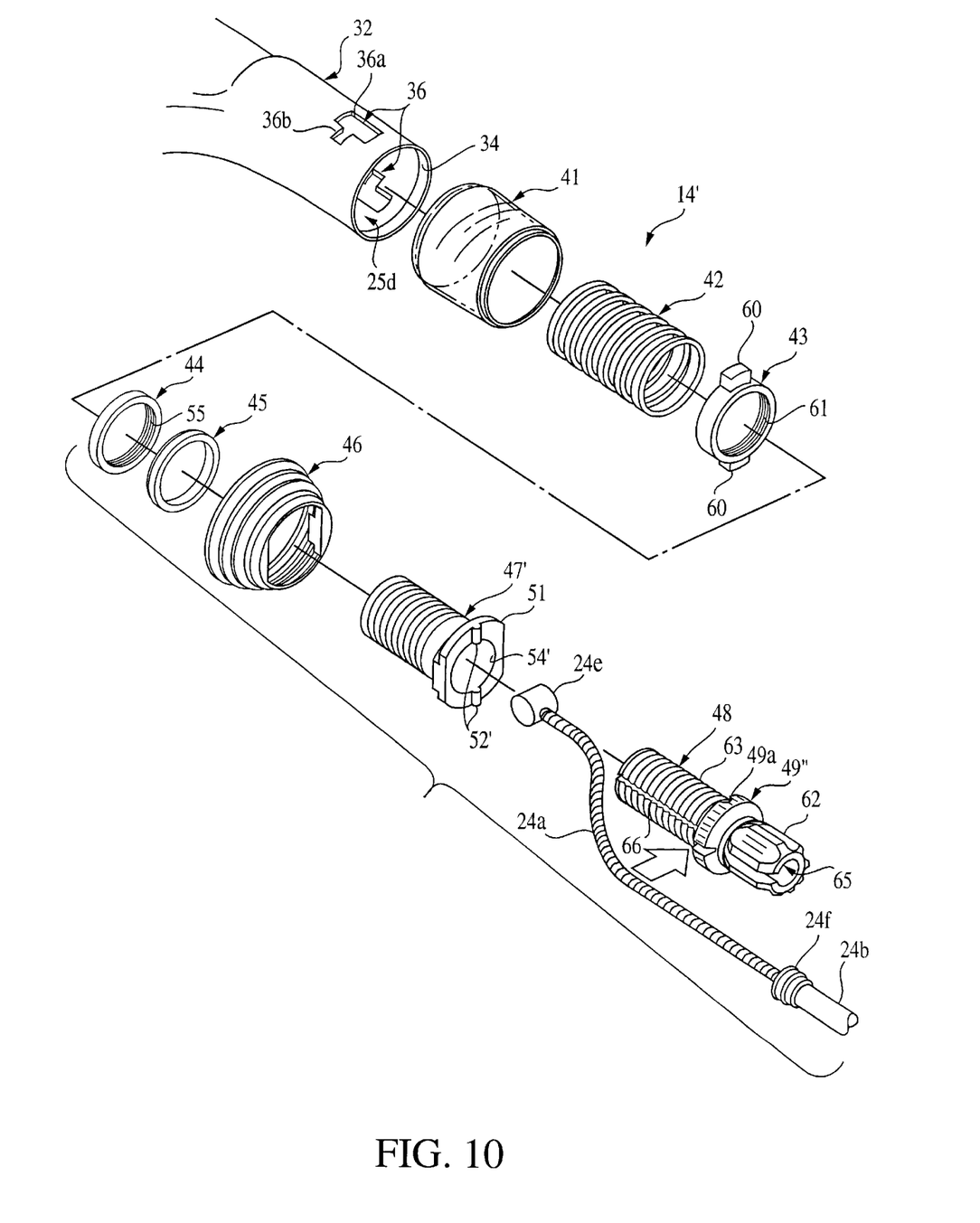
FIG. 10 is a partial exploded top perspective view of a modified brake operating device with a braking power modulator in accordance with a second embodiment of the present invention.

Referring now to FIG. 10, the braking power modulator 14' of the brake operating device 12 has been modified in accordance with a second embodiment of the present invention. Specifically, the brake operating device 12 as illustrated in FIG. 10 is identical to the first embodiment, discussed above, except that a modified modulating bolt or member 47' and a modified cable tensioning nut 49' are used in the second embodiment of the present invention. Thus, only the differences between the first and second embodiments will be discussed herein. Moreover, the reference numerals of the first embodiment will be used to indicate the parts of this second embodiment that are the same parts in the first embodiment.

In this embodiment, modulating member 47' has been modified so that the cable receiving bore 54' does not have internal threads. Therefore, cable tensioning bolt 48 fit freely into cable receiving bore 54'. Moreover, the abutment flange 51' is provided with a pair of protrusions 52' that engage a pair of recesses 49*a* (only one shown) formed in cable tensioning nut 49'. Preferably, protrusions 52 are spaced 180° apart about the longitudinal axis of modulating member 47'. Similarly, recesses 49*a* are also spaced 180° apart about the longitudinal axis of the cable tensioning nut 49' to mate with protrusions 52. Protrusions 52 engage recesses 49*a* such that relative rotational movement of modulating member 47' and cable tensioning nut 49' is limited. When brake operating device 12 and cable 24 are coupled together, the outer casing 24*b* applies an axial force on cable tensioning bolt 48 such that cable tensioning nut 49' is forced against abutment flange 51'.

THIRD EMBODIMENT

Figure 11:
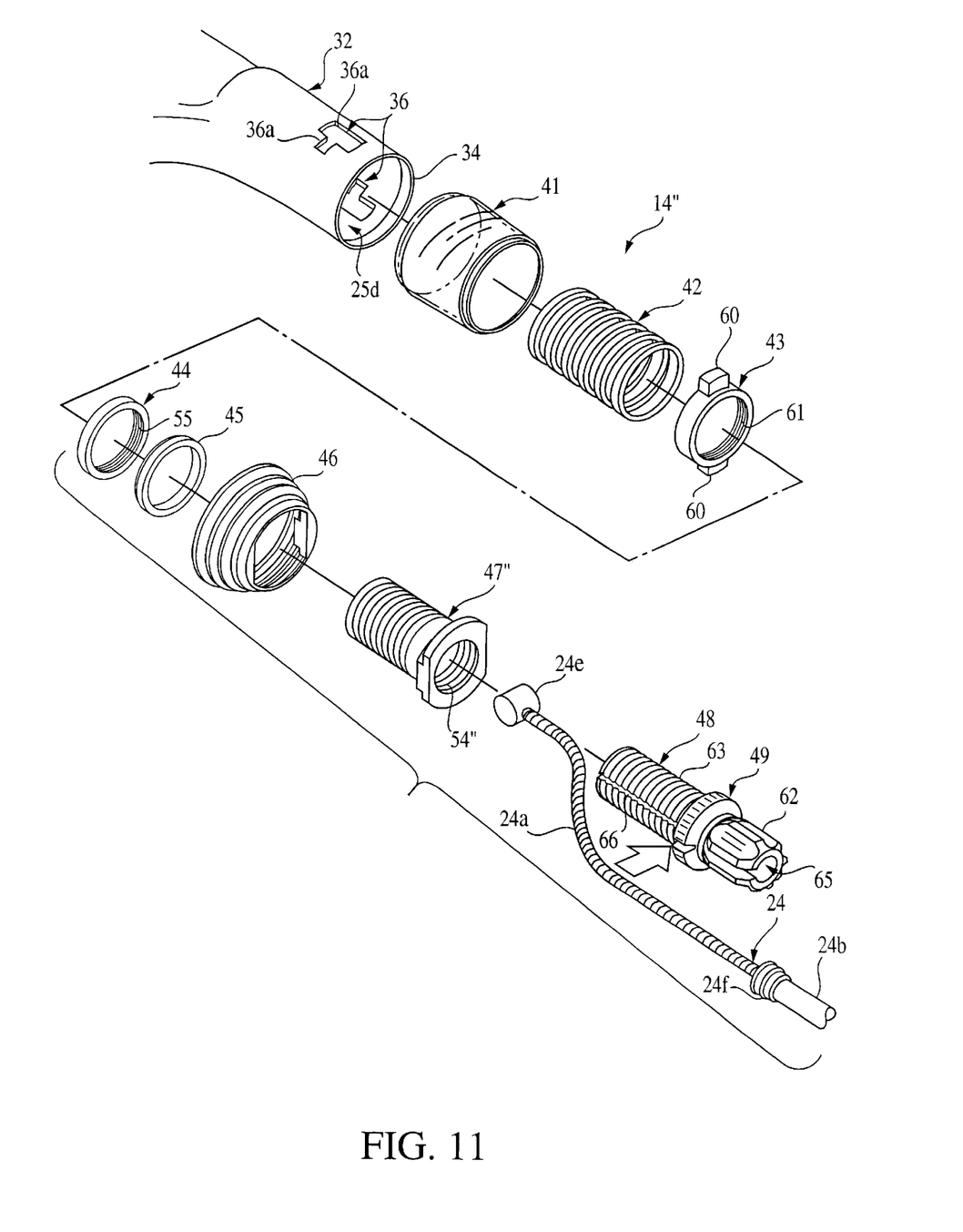
FIG. 11 is a partial exploded top perspective view of a modified brake operating device with a braking power modulator in accordance with a third embodiment of the present invention.

Referring now to FIG. 11, the braking power modulator 14" of the brake operating device 12 has been modified in accordance with a third embodiment of the present invention. Specifically, the brake operating device 12 as illustrated in FIG. 11 is identical to the first embodiment, discussed above, except that a modified modulating bolt or member 47" is used in the third embodiment of the present invention. Thus, only the differences between the first and third embodiments will be discussed herein. Moreover, the reference numerals of the first embodiment will be used to indicate the parts of this third embodiment that are the same parts in the first embodiment.

In this embodiment, modulating bolt or member 47" has a smooth cable receiving bore 54" (no threads) similar to the second embodiment, except that a longitudinally extending protrusion 54*a* is formed on cable receiving bore 54". This protrusion 54*a* is adapted to overridably engage the longitudinally extending slot 66 of cable tensioning bolt 48. In other words, when protrusion 54*a* is received within longitudinal slot 66, rotational movement between modulating member 47 and cable tensioning bolt 48 is limited. Rotation of cable tensioning nut 49 causes cable tensioning bolt 48 to move axially within cable receiving bore 54" of modulating member 47". Accordingly, the cable 24 can be adjusted in a conventional manner.

FOURTH EMBODIMENT

Referring now to FIG. 12, the braking power modulator 14''' of the brake operating device 12 has been modified in accordance with a fourth embodiment of the present invention. Specifically, the brake operating device 12 as illustrated in FIG. 12 is identical to the first embodiment, discussed above, except that in this embodiment the adjusting member 43, the preload nut 44, the sealing member 46 and the modulating member 47 have been replaced with a modified adjusting nut or member 43''' and a modified modulating bolt or member 47'''. Thus, only the differences between the first and fourth embodiments will be discussed herein. Moreover, the reference numerals of the first embodiment will be used ti indicate the parts of this fourth embodiment that are the same parts in the first embodiment.

Basically, modulating member 47''' has been designed so that a preload flange 44''' is integrally formed therewith. In other words, the preload nut 44 of the first embodiment has been made to be integrally formed with the modulating member 47''' to form a one-piece unitary member. Also, a stopper or washer 52''' has been fixedly coupled to the inner end of modulating member 47 to form a stop so as to prevent the adjusting member or nut 43''' from being disengaged from modulating member 47'''. Preferably, the free inner end of modulating member 47''' is crimped or deformed so that stopper 52''' is retained thereon.

In this fourth embodiment, the cable receiving bore 54''' is unthreaded, similar to the second and third embodiments. This embodiment can utilize either the indexing mechanism of the second embodiment or the indexing mechanism of the third embodiment. In other words, the cable receiving bore 54''' can have a longitudinally extending protrusion for engaging the slot 66 of cable tensioning bolt 48 similar to the third embodiment. Alternatively, the outer end of the modulating member 54''' can include a pair of protrusions that engage a pair of recesses formed in the cable tensioning nut 49'''. Moreover, while the sealing member 46 has been eliminated in this embodiment, it will be obvious to one of ordinary skill in the art from this disclosure that a sealing member could be added if needed and/or desired.

While only selected embodiments have been chosen to illustrate the present invention, it will be apparent to those skilled in the art from this disclosure that various changes and modifications can be made herein without departing from the scope of the invention as defined in the appended claims. For example, in accordance with one aspect of the present invention, the adjustment mechanism and/or the tension adjustment mechanism can be eliminated. Furthermore, the foregoing description of the embodiments according to the present invention are provided for illustration only, and not for the purpose of limiting the invention as defined by the appended claims and their equivalents.

What is claimed is:

1. A brake operating device for a bicycle comprising:
   a mounting member adapted to be coupled to a handlebar, said mounting member having a cable passageway with a first abutment and a second abutment;
   a brake lever pivotally coupled to said mounting member, said brake lever having a cable attachment portion;
   a biasing member disposed in said cable passageway, said biasing member having first and second portions with said first portion of said biasing member being operatively coupled to said first abutment;
   a modulating member movably arranged within said cable passageway and operatively biased against said second abutment by said second portion of said biasing member; and
   an adjusting member movably arranged along said modulating member such that said adjusting member is movable relative to said modulating member, said adjusting member being biased toward said second abutment of said mounting member.

2. A brake operating device according to claim 1, wherein said adjusting member is movably coupled to said modulating member to adjust a pre-set compression force of said biasing member without changing a predetermined modulator stroke of said modulating member.

3. A brake operating device according to claim 1, wherein said mounting member includes a slot for viewing relative positioning of said adjusting member within said mounting member.

4. A brake operating device according to claim 3, wherein a transparent cover overlies said slot of said mounting member to prevent contamination.

5. A brake operating device according to claim 3, wherein said adjusting member has a tab engaging said slot to limit relative rotational movement between said mounting member and said adjusting member.

6. A brake operating device according to claim 3, wherein said mounting member includes indicia that represent settings of said pre-set compression force.

7. A brake operating device according to claim 1, wherein said adjusting member includes a nut that is threadedly coupled to said modulating member.

8. A brake operating device according to claim 1, wherein said biasing member is a coil spring.

9. A brake operating device according to claim 1, wherein said adjusting member is adjustable to change a pre-set compression force of said biasing member between a low spring force position and a high spring force position.

10. A brake operating device according to claim 1, further comprising
   a cable tensioning member movably coupled relative to said modulating member.

11. A brake operating device for a bicycle comprising:
   a mounting member adapted to be coupled to a handlebar, said mounting member having a cable passageway with a first abutment and a second abutment;
   a brake lever pivotally coupled to said mounting member, said brake lever having a cable attachment portion;
   a biasing member disposed in said cable passageway, said biasing member having first and second portions with said first portion of said biasing member being operatively coupled to said first abutment;
   a modulating member movably arranged within said cable passageway and operatively biased against said second abutment by said second portion of said biasing member;
   an adjusting member movably arranged along said modulating member and biased toward said second abutment of said mounting member; and
   a cable tensioning member movably coupled relative to said modulating member, said cable tensioning member including a threaded shaft that is threadedly received in a threaded bore of said modulating member.

12. A brake operating device according to claim 11, wherein
   said cable tensioning member includes a cable adjusting nut that is threadedly coupled on said threaded shaft.

13. A brake operating device according to claim 10, wherein
   said cable tensioning member includes a threaded shaft received in an unthreaded bore of said modulating member and a cable adjusting nut that is threadedly coupled on said threaded shaft.

14. A brake operating device for a bicycle comprising:
   mounting member adapted to be coupled to a handlebar, said mounting member having a cable passageway with a first abutment and a second abutment;
   a brake lever pivotally coupled to said mounting member, said brake lever having a cable attachment portion;
   a biasing member disposed in said cable passageway, said biasing member having first and second portions with said first portion of said biasing member being operatively coupled to said first abutment;
   a modulating member movably arranged within said cable passageway and operatively biased against said second abutment by said second portion of said biasing member;
   an adjusting member movably arranged along said modulating member and biased toward said second abutment of said mounting member; and a cable tensioning member movably coupled relative to said modulating member, said cable tensioning member including a threaded shaft received in an unthreaded bore of said modulating member and a cable adjusting nut that is threadedly coupled on said threaded shaft, said cable adjusting nut and said modulating member having a pair of mating surfaces with one of said mating surfaces having a protusion and the other of said mating surfaces having a corresponding recess to limit rotational movement therebetween.

15. A brake operating device for a bicycle comprising:

a mounting member adapted to be coupled to a handlebar, said mounting member having a cable passageway with a first abutment and a second abutment;

a brake lever pivotally coupled to said mounting member, said brake lever having a cable attachment portion;

a biasing member disposed in said cable passageway, said biasing member having first and second portions with said first portion of said biasing member being operatively coupled to said first abutment;

a modulating member movably arranged within said cable passageway and operatively biased against said second abutment by said second portion of said biasing member;

an adjusting member movably arranged along said modulating member and biased toward said second abutment of said mounting member; and a cable tensioning member movably coupled relative to said modulating member, said cable tensioning member including a threaded shaft received in an untheaded bore of said modulating member and a cable adjusting nut that is treadedly coupled on said threaded shaft, said threaded shaft of said cable tensioning member having a longitudinal slit and said unthreaded bore having a protrusion that engages said slit to limit rotational movement of said cable tensioning member when said protrusion is located within said slit.

16. A brake operating device according to claim 1, wherein said mounting member, said modulating member and said adjusting member are configured to selectively lock said modulating member relative to said mounting member to be effectively non-movable.

17. A brake operating device according to claim 16, wherein said adjusting member has a tab that selectively engages a slot of said mounting member to prevent relative longitudinal movement between said mounting member and said adjusting member.

18. A brake operating device according to claim 17, wherein said slot including a longitudinal portion and a transverse portion, said longitudinal portion being arranged to allow relative longitudinal movement between said mounting member and said adjusting member when said tab is located in said longitudinal portion, and said transverse portion being arranged to prevent relative longitudinal movement between said mounting member and said adjusting member when said tab is located in said transverse portion.

19. A brake operating device according to claim 18, wherein said slot of mounting member being arranged for viewing relative positioning of said tab of said adjusting member within said mounting member.

20. A brake operating device according to claim 19, wherein a transparent cover overlies said slot of said mounting member to prevent contamination.

21. A brake operating device according to claim 1, wherein said modulating member has a cable receiving bore that is sized to permit a cable nipple to pass therethrough.

22. A brake operating device according to claim 21, further comprising a cable tensioning member movably coupled relative to said modulating member.

23. A brake operating device for a bicycle comprising:

a mounting member adapted to be coupled to a handlebar, said mounting member having a cable passageway with a first abutment and a second abutment;

a brake lever pivotally coupled to said mounting member, said brake lever having a cable attachment portion;

a biasing member disposed in said cable passageway, said biasing member having first and second portions with said first portion of said biasing member being operatively coupled to said first abutment;

a modulating member movably arranged within said cable passageway and operatively biased against said second abutment by said second portion of said biasing member, said modulating member having a cable receiving bore that is sized to permit a cable nipple to pass therethrough;

an adjusting member movably arranged along said modulating member and biased toward said second abutment of said mounting member; and a cable tensioning member movably coupled relative to said modulating member, said cable tensioning member including a threaded shaft that is threadedly received in a threaded bore of said modulating member.

24. A brake operating device according to claim 23, wherein said cable tensioning member includes a cable adjusting nut that is threadedly coupled on said threaded shaft.

25. A brake operating device according to claim 22, wherein said cable tensioning member includes a threaded shaft received in an unthreaded bore of said modulating member and a cable adjusting nut that is threadedly coupled on said threaded shaft.

26. A brake operating device for a bicycle comprising:

a mounting member adapted to be coupled to a handlebar, said mounting member having a cable passageway with a first abutment and a second abutment;

a brake lever pivotally coupled to said mounting member, said brake lever having a cable attachment portion;

a biasing member disposed in said cable passageway, said biasing member having first and second portions with said first portion of said biasing member being operatively coupled to said first abutment;

a modulating member movably arranged within said cable passageway and operatively biased against said second abutment by said second portion of said biasing member, said modulating member having a cable receiving bore that is sized to permit a cable nipple to pass therethrough;

an adjusting member movably arranged along said modulating member and biased toward said second abutment of said mounting member; and a cable tensioning member movably coupled relative to said modulating member, said cable tensioning member including a threaded shaft received in an unthreaded bore of said modulating member and a cable adjusting nut that is threadedly coupled on said threaded shaft, said cable adjusting nut and said modulating member having a pair of mating surfaces with one of said mating surfaces having a protrusion and the other of said mating surfaces having a corresponding recess to limit rotational movement therebetween.

27. A brake operating device for a bicycle comprising:

a mounting member adapted to be coupled to a handlebar, said mounting member having a cable passageway with a first abutment and a second abutment;

a brake lever pivotally coupled to said mounting member, said brake lever having a cable attachment portion;

a biasing member disposed in said cable passageway, said biasing member having first and second portions with said first portion of said biasing member being operatively coupled to said first abutment;

a modulating member movably arranged within said cable passageway and operatively biased against said second abutment by said second portion of said biasing member, said modulating member having a cable receiving bore that is sized to permit a cable nipple to pass therethrough;

an adjusting member movably arranged along said modulating member and biased toward said second abutment of said mounting member; and a cable tensioning member movably coupled relative to said modulating member, said cable tensioning member including a threaded sha received in and treaded bore of said modulating member and a cable adjusting nut that is threadedly coupled on said threaded shaft, said threaded shaft of said cable tensioning member having a longitudinal slit and said unthreaded bore having a protrusion that engages said slit to limit rotational movement of said cable tensioning member when said protrusion is located within said slit.

28. A brake operating device according to claim 1, further comprising a sealing member effectively coupled between said modulating member and said mounting member.

29. A brake operating device according to claim 7, wherein said modulating member has a stopper arranged to prevent said nut from being removed.

30. A brake operating device according to claim 29, wherein said stopper of said modulating member is a washer and said modulating member is configured to secure said stopper to said modulating member.

31. A brake operating device according to claim 1, wherein said modulating member has an abutment portion that contacts said second abutment.

32. A brake operating device according to claim 31, wherein said abutment portion of said modulating member is a flange that is integrally formed with a shaft portion of said modulating member as a one-piece, mutably member.

33. A brake operating device for a bicycle comprising:

a mounting member adapted to be coupled to a handlebar, said mounting member having a cable passageway with a first abutment and a second abutment;

a brake lever pivotally coupled to said mounting member, said brake lever having a cable attachment portion;

a modulating member movably arranged within said cable passageway between said first and second abutments, said modulating member having a first cable receiving bore extending longitudinally therethrough;

a biasing member disposed in said cable passageway, said biasing member having a first portion operatively coupled to said first abutment and a second portion operatively coupled to said modulating member to operatively bias said modulating member against said second abutment; and a cable tensioning member adjustably coupled to said modulating member such that the relative position of said cable tensioning member is adjustable relative to said modulating member, said cable tensioning member and said modulating member moving together when said brake operating device is actuated, said cable tensioning member having a second cable receiving bore extending longitudinally therethrough and a longitudinal slit connected to said second cable receiving bore such that a cable can be laterally inserted into said second cable bore via said longitudinal slit.

34. A brake operating device according to claim 33, wherein said first cable receiving bore has a larger diameter than said second cable receiving bore.

* * * * *